United States Patent [19]
Carrea et al.

[11] Patent Number: 5,902,561
[45] Date of Patent: *May 11, 1999

[54] LOW TEMPERATURE INERT GAS PURIFIER

[75] Inventors: Giovanni Carrea; Brian D. Warrick, both of Colorado Springs, Colo.

[73] Assignee: D.D.I. Limited, British West Indies

[*] Notice: This patent issued on a continued prosecution application filed under 37 CFR 1.53(d), and is subject to the twenty year patent term provisions of 35 U.S.C. 154(a)(2).

[21] Appl. No.: 08/536,864

[22] Filed: Sep. 29, 1995

[51] Int. Cl.$^6$ .......................... B01J 23/755; B01D 53/02; B01D 59/26

[52] U.S. Cl. .................. 423/210; 423/230; 423/239.1; 423/247; 502/335; 502/337; 96/108; 96/121; 96/132

[58] Field of Search .................. 502/53, 56, 325, 502/335, 337; 95/114–120, 126, 127; 96/108, 121, 126, 131, 132, 143; 423/210, 247, 230, 239.1

[56] References Cited

U.S. PATENT DOCUMENTS

| | | | |
|---|---|---|---|
| 4,312,669 | 1/1982 | Boffito et al. | 75/177 |
| 4,579,723 | 4/1986 | Weltmer et al. | 423/219 |
| 4,713,224 | 12/1987 | Tamhankar et al. | 423/219 |
| 5,110,569 | 5/1992 | Jain | 423/230 |
| 5,202,096 | 4/1993 | Jain | 422/190 |
| 5,238,469 | 8/1993 | Briesacher et al. | 95/115 |

OTHER PUBLICATIONS

U.S. application No. 08/505,136, Carrea et al., filed Jul. 21, 1995.

*Primary Examiner*—Michael L. Lewis
*Assistant Examiner*—Alexander G. Ghyka
*Attorney, Agent, or Firm*—David H. Jaffer

[57] ABSTRACT

A two-stage process method for removal of impurities such carbon monoxide, carbon dioxide, oxygen, water, hydrogen, and methane from inert gases at ambient temperature (0°–60° C.). In the first stage the inert gas is contacted with a nickel catalyst, and in the second stage the inert gas is passed over a getter alloy. Purified gas exiting the second stage of the purifier contains less than one part per billion (ppb) levels of the impurities. The nickel catalyst and getter alloy are initially activated at elevated temperature. The catalyst and getter may be reactivated by heating and purging, and hydrogen previously removed from impure gas can be used in the reactivation process.

24 Claims, 8 Drawing Sheets

LOW TEMPERATURE INERT GAS PURIFIER

BACKGROUND OF THE INVENTION

1. Field of the Invention

The invention relates generally to a method and apparatus for removal of impurities from inert gases, such as noble gases and nitrogen. In particular, the invention relates to a two-stage purification process conducted at room temperature which achieves removal of contaminants to less then one part per billion (ppb). The first stage contains nickel on a substrate, and the second stage contains a getter alloy.

2. Brief Description of the Prior Art

Numerous methods are disclosed in the prior art for removal of impurities from inert gases. Many methods use a getter material, elevated to high temperatures, for removal of the impurities. In co-pending U.S. application Ser. No. 08/505,136, filed Jul. 21, 1995 (published as WIPO Publication No. WO 97/0345), there is disclosed a method for removal of impurities from noble gases and nitrogen using three temperature zones in a single purifier vessel. In the first zone of the vessel, the gas is preheated to a temperature greater than 400° C.; in the second zone, the preheated gas is contacted with a getter material at greater than 335° C. for removal of impurities such as methane, water, carbon monoxide, nitrogen, oxygen, and carbon dioxide; in the final zone, the gas being purified is contacted with a second getter material at a temperature greater than 150° C. for removal of hydrogen. While this method is effective, the high temperature, three-step purification process requires a relatively expensive purifier.

Another well known method used to purify inert gases uses three different purification beds. The first bed contains palladium or platinum on an alumina/silica substrate. As the unpurified inert gas passes over this catalyst bed at a temperature of at least 350° C., hydrogen combines with added oxygen to form water, methane combines with added oxygen to form carbon dioxide and water, and carbon monoxide combines with added oxygen to form carbon dioxide. The second stage of the purifier uses nickel on an alumina/silica substrate. Once the catalyst is activated, it operates at room temperature allowing the following reactions to occur: nickel combines with carbon monoxide to form nickel carbon monoxide, nickel combines with added oxygen to form nickel oxide, and nickel oxide combines with hydrogen to form elemental nickel and water. The third stage of the purifier is a molecular sieve absorption bed, in which water and carbon dioxide are reversibly absorbed. This stage is operated at room temperature with regeneration at 350° C. Purity in the less than 1 ppb range is achieved with this method. There are two disadvantages with this type of purifier. The first is that oxygen is required, which necessitates introduction of oxygen into the gas stream. The second disadvantage is that the catalyst must be maintained at a temperature of at least 350° C. for these reactions to occur.

A third method for purifying an inert gas stream uses a one-step process. U.S. Pat. No. 4,713,224 teaches a method whereby an inert gas is passed over a catalyst of nickel and an inert material. The catalyst is at least 5% by weight nickel and the method is operated at temperatures of between 0° and 50° C. This method removes carbon monoxide, carbon dioxide, oxygen, hydrogen, and water vapor to levels on the order of 0.1–1.0 ppm, and does not remove methane and other hydrocarbons.

SUMMARY OF THE INVENTION

It is an object of the present invention to provide a method for removal of impurities from inert gases to levels of less than one part per billion (ppb).

It is a further object of the present invention to provide a method in which impurities typically found in inert gases (such as methane, hydrogen, water, carbon monoxide, oxygen, and carbon dioxide) are removed at room temperature.

Another object of the present invention is to provide a method for removal of impurities from inert gases in which the materials used to remove the impurities have increased lifetimes and require infrequent regeneration.

A further object of the present invention is to provide a method for activation of the materials used to remove impurities from impure inert gases.

Still another object of the present invention is to provide a method for regeneration of the purification materials, using hydrogen removed from impure inert gases.

Briefly, the preferred embodiment of the present invention is a two-stage method for removing impurities such as carbon monoxide, carbon dioxide, oxygen, water, hydrogen, and methane to sub-ppb levels from an inert gas at ambient temperature (0°–60° C.). In the first stage the inert gas is passed over a nickel catalyst, and in the second stage the gas is passed through a getter alloy. The nickel catalyst and getter alloy are initially activated at elevated temperature. The catalyst and getter may be reactivated by heating and purging, and hydrogen previously removed from impure gas streams can be used in the reactivation process.

IN THE DRAWINGS

Figure 3A:
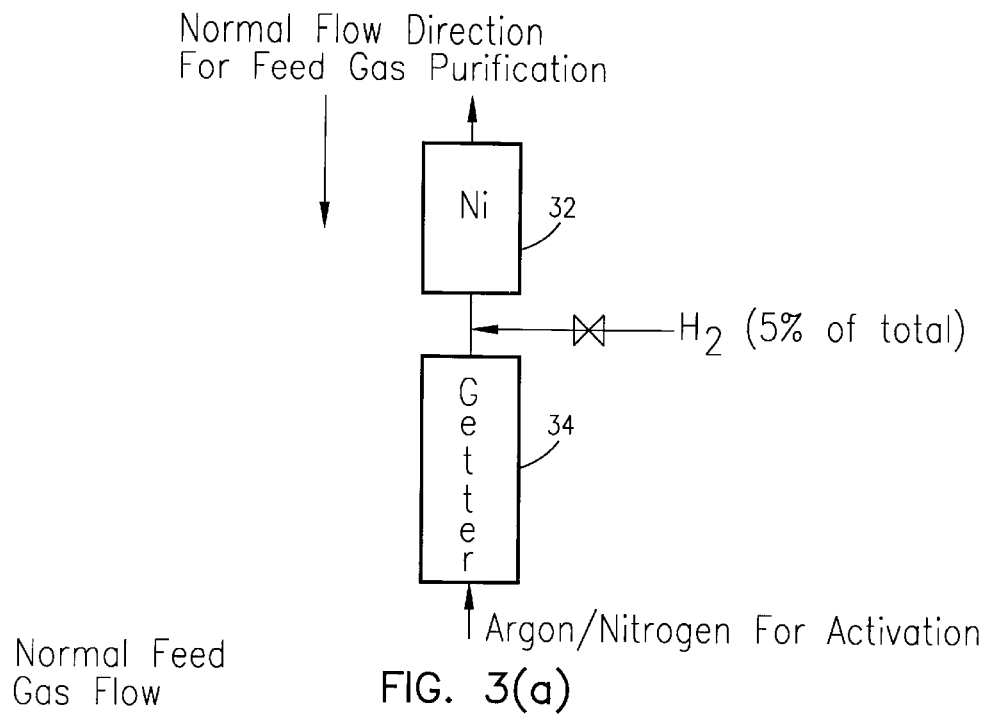
Figure 3B:
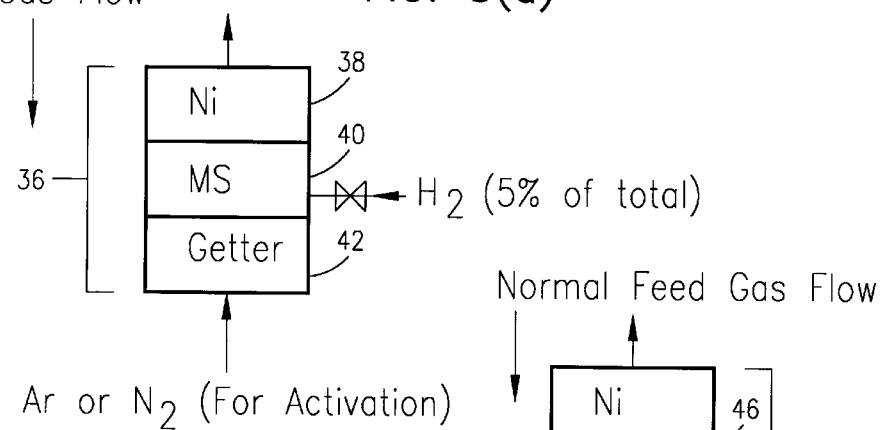
Figure 3C:
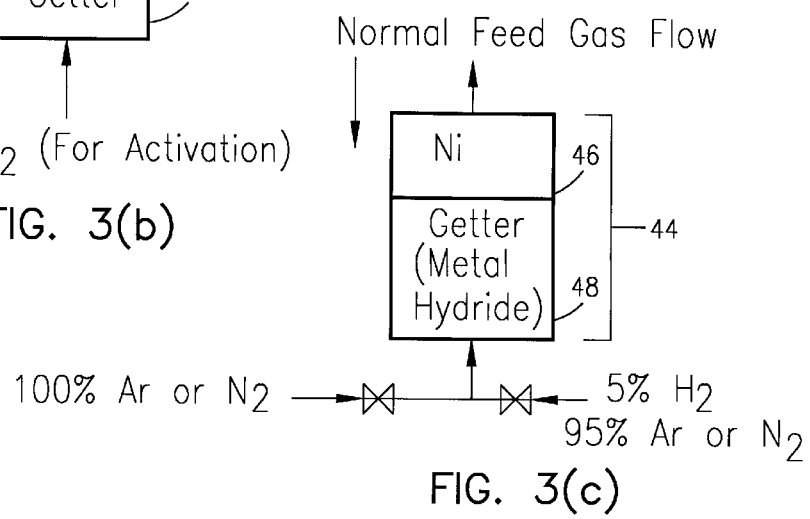
Figure 4:
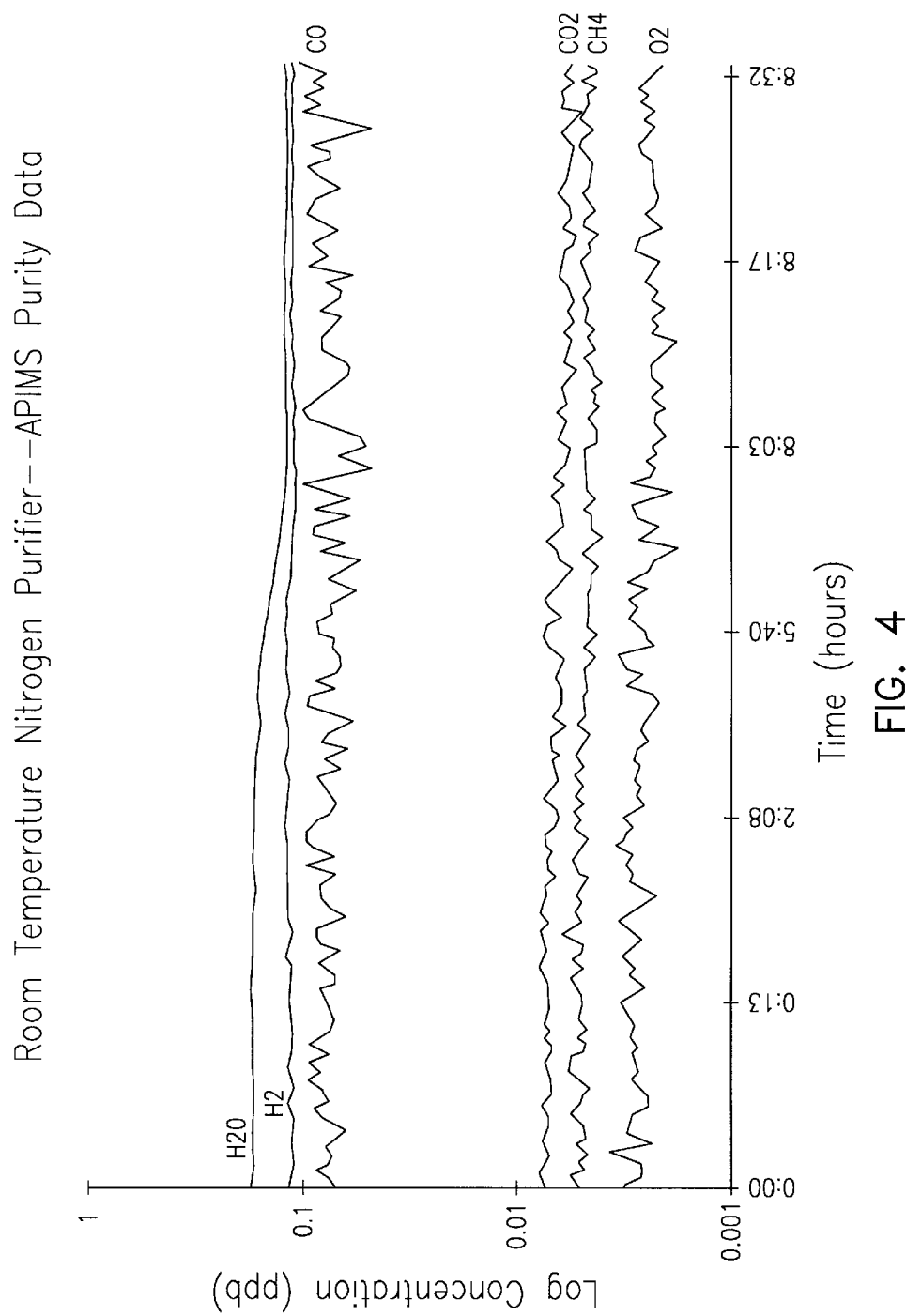
Figure 5:
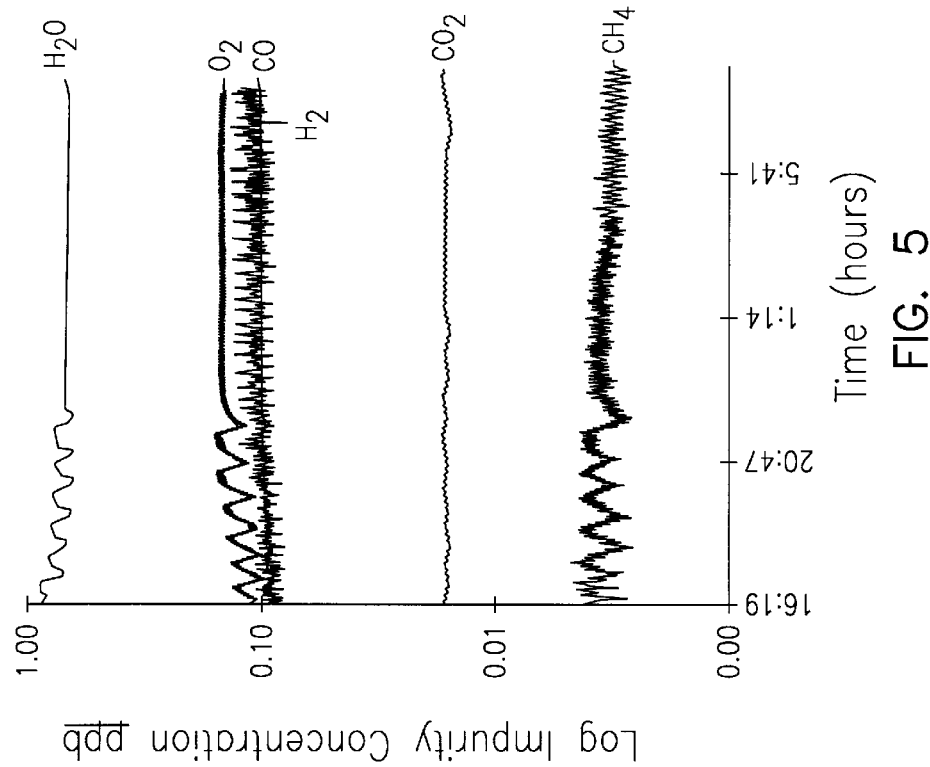
Figure 6:
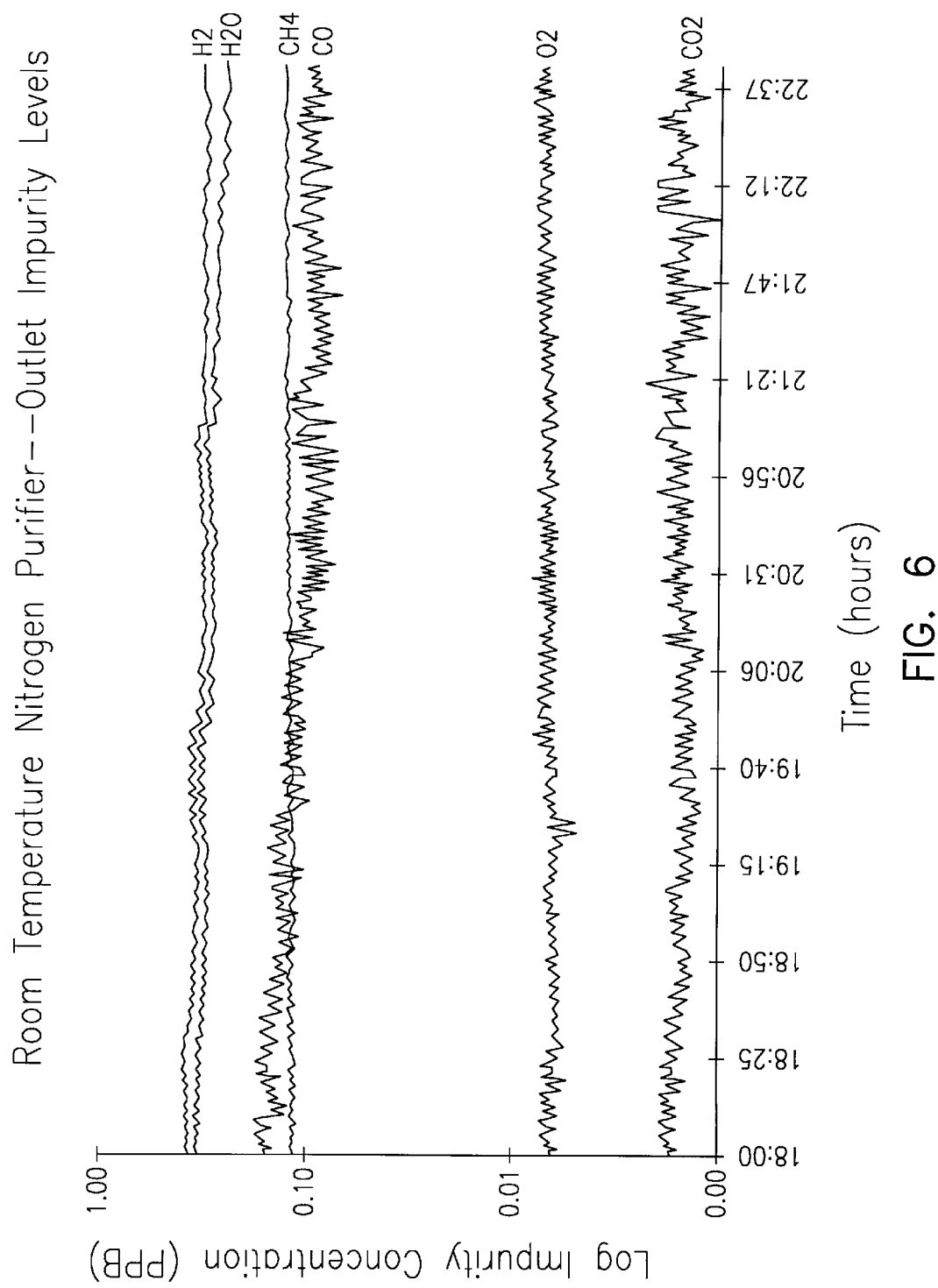
Figure 7:
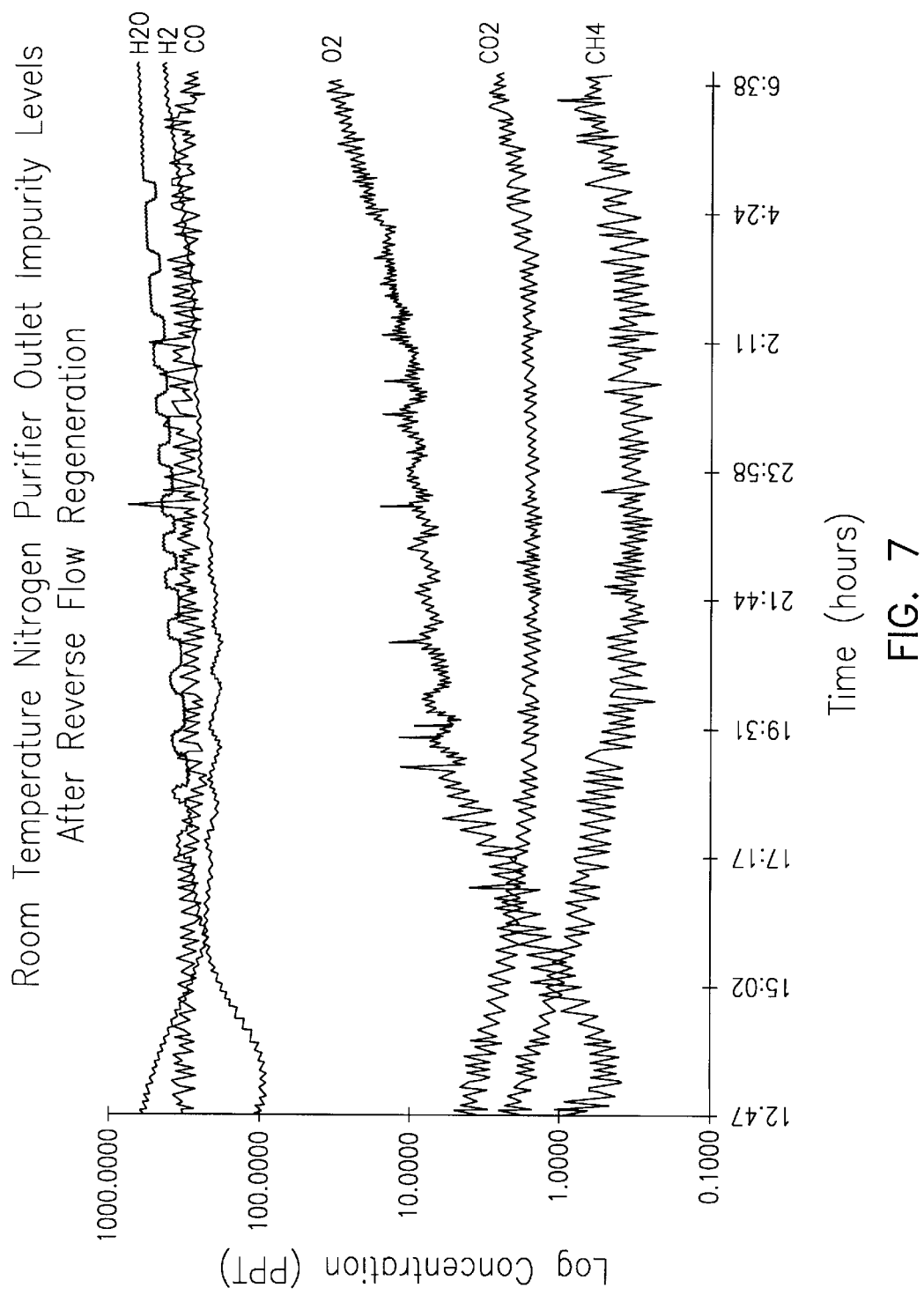
Figure 8:
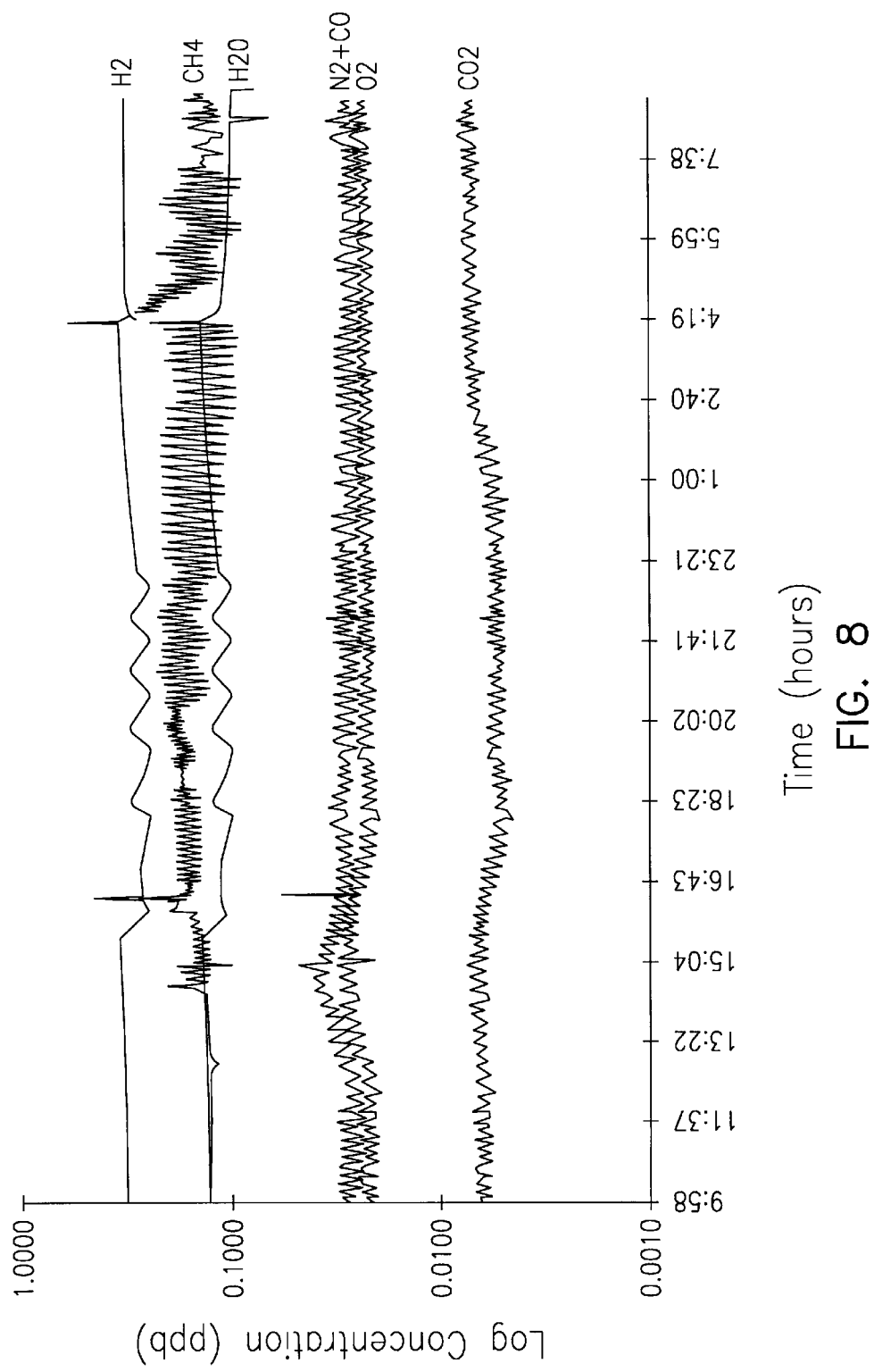

FIGS. 3(a)–3(c) illustrate preferred embodiments of the present invention;

FIG. 4 shows nitrogen purification results obtained using the purifier system shown in FIG. 3(a);

FIG. 5 shows nitrogen purification results obtained using the purifier system shown in FIG. 3(b);

FIG. 6 shows nitrogen purification results obtained using the systems shown in FIG. 3(c);

FIG. 7 illustrates nitrogen purification results using regenerated catalyst and getter materials; and FIG. 8 illustrates argon purification results using the purifier system of the present invention.

DETAILED DESCRIPTION OF THE PREFERRED EMBODIMENT

This invention provides an apparatus and a method which remove impurities from inert gases at room temperature to levels of less than 1 ppb. An inert gas stream, typically nitrogen or argon, which may contain impurities in up to parts per million levels, is further purified to produce an inert gas with less than one part per billion levels of impurities. The inert gas stream is typically available from conventional cryogenic air separation units where purities of 99.999 percent purity (maximum impurity levels of 10 ppm) are readily obtainable. Commercially available cylinder gases may also be used. Typical impurities in such inert gas streams include oxygen, hydrogen, carbon monoxide, methane, water and carbon dioxide. Any argon or helium present in a nitrogen stream is not considered an impurity, and vice versa.

Figure 1:
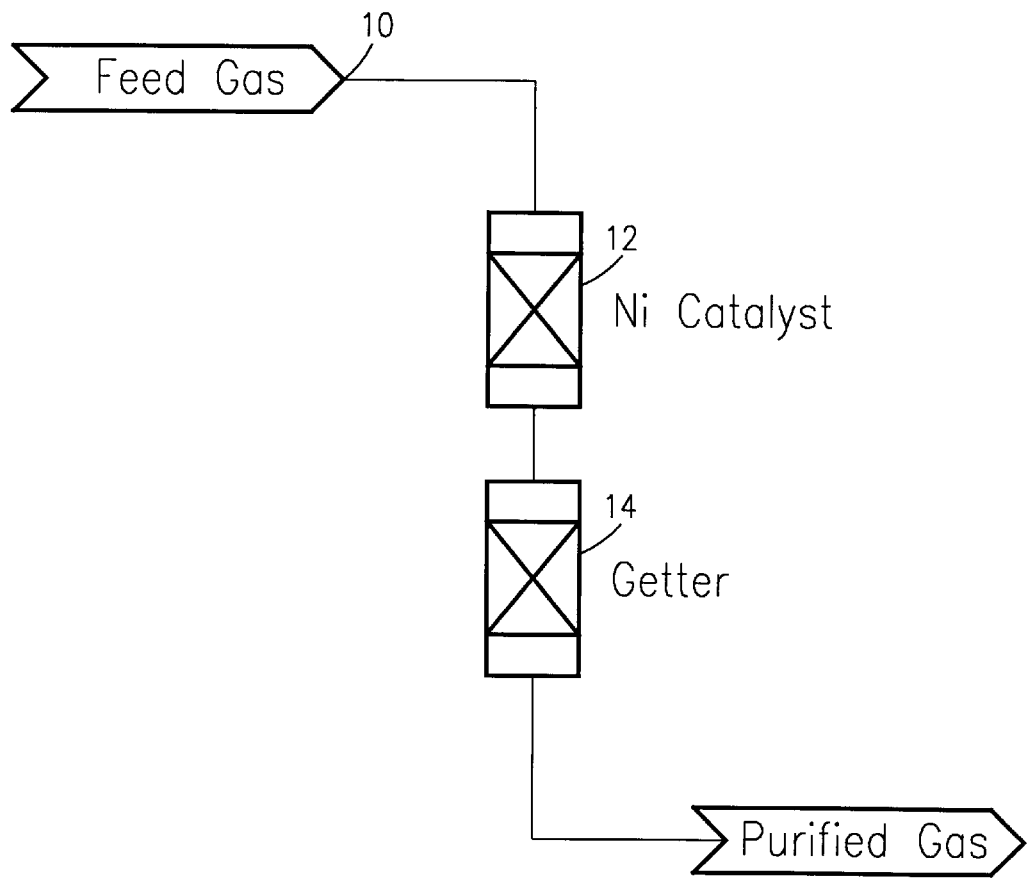
FIG. 1 is a flow diagram of the two-stage purification system of the present invention.

Referring to FIG. 1, a flow diagram for a gas purification system in accordance with the present invention is shown. A feed gas source 10 provides the inert gas which is to be purified. The feed gas is passed through a two-stage purification process at ambient temperature (0°–60° C.). In the first stage 12, the feed gas is contacted with a nickel catalyst. In the second stage 14, the feed gas is contacted with a getter material. Purified gas with sub-ppb levels of contaminants is then ready for use. A single vessel with separate nickel catalyst and getter beds may be used, or the beds may be in separate vessels. In the preferred embodiment, one or two stainless steel vessels are used. The vessels include suitable internal support assemblies for the catalyst and getter beds. In an alternative embodiment, suitable for use when the feed gas has high levels of carbon dioxide or water, an intermediate stage of molecular sieve is utilized to remove the carbon dioxide and water. Again, this molecular sieve may be included in a single vessel with both catalyst and getter stages, or multiple vessels may be used.

The inert gas to be purified is fed into the first stage of the purification vessel, where a bed of particulate material is supported. The particulate material is comprised of nickel in an amount of about 1% to 5% by weight nickel, as elemental nickel, with an inert material, such as alumina and/or silica and may be supported, for example, on a silica-based substrate. The nickel, as elemental nickel, has a surface area of at least about 1 m$^2$/g, and typically a surface area of from 100–300 m$^2$/g. The particulate material is generally in the shape of pellets having a diameter of from 1/8"–1/4" and a length of from 1/8"–1/4".

The particulate material typically is available in a reduced and stabilized form, i.e., significant amounts of nickel (5–10%) which has been passivated with $CO_2$. If CO is present, NiCO is also formed. Before the material may be used for purification, the $CO_2$, CO, and NiCO must be removed. This is accomplished by heating the material to about 300° C. while flowing a mixture of 5% hydrogen/95% argon. This causes reactions of the form:

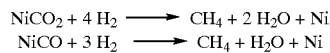

The process for nickel activation is described below with reference to specific embodiments.

Once the bed of particulate material containing nickel is activated, the inert gas to be treated is introduced at ambient temperature (0°–60° C.) through an inlet conduit into the vessel. During passage through the bed of nickel-containing particulate material, the following reactions occur:

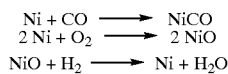

Although these reactions indicate that the nickel reactions will remove hydrogen from the feed gas, typically not all of the hydrogen will be moved in the nickel stage. This is because in cryogenically produced inert feed gases, the hydrogen levels are significantly greater than the oxygen levels. Therefore, most of the hydrogen will not react with NiO, as relatively little Nio will be produced.

Water and carbon dioxide are adsorbed on the alumina/silica substrate of the first stage. If the feed gas contains high water, carbon dioxide or hydrogen levels (since hydrogen reacts with NiO to form water), an intermediate stage containing molecular sieve is preferred to ensure removal of water and carbon dioxide.

Figure 2:
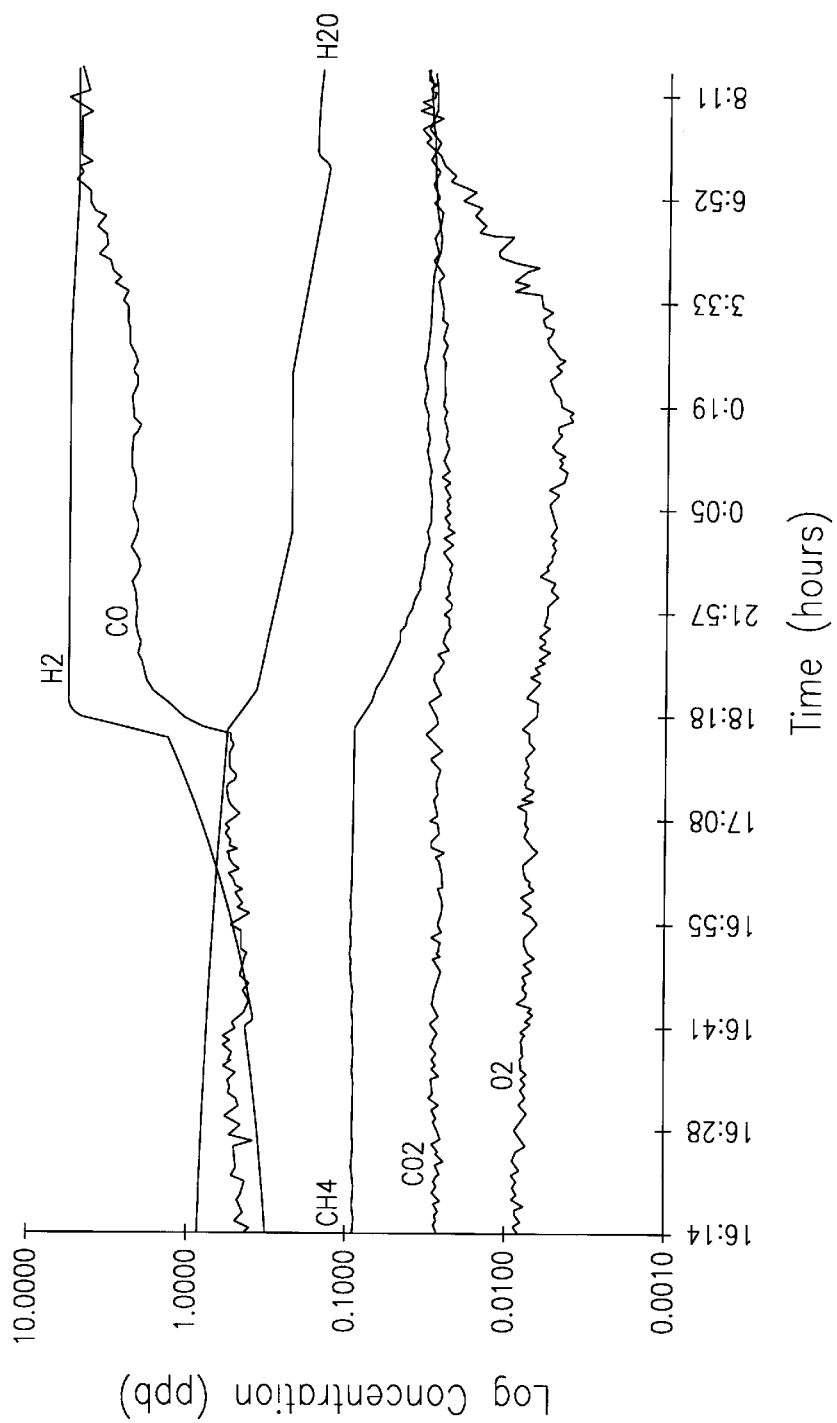
FIG. 2 shows purification results when a single stage zirconium-iron getter material is used to purify nitrogen at room temperature.

As described in co-pending application Ser. No. 08/505,136 (published as No. 97/03745) the disclosure of which is incorporated by this reference), alloys containing zirconium, vanadium, and iron are effective in removing impurities from inert gas streams at high temperatures. Once the getter is activated (i.e. elevated at high temperature to drive off absorbed impurities) the getter may be operated at room temperature. However, at these ambient temperatures, only surface sorption occurs. Carbon monoxide in a gas stream may quickly passivate the surface of the getter, allowing carbon monoxide and hydrogen to easily pass through the getter. FIG. 2 illustrates the operation of an inert gas purifier (with nitrogen the gas being purified) at room temperature with zirconium-iron getter material. Note that the purifier initially removes impurities to below ppb levels. However, after about two hours, the surface of the getter becomes passivated with carbon monoxide, and carbon monoxide and hydrogen pass through the purifier.

The discussion above of the first stage of the purifier illustrates how carbon monoxide can be removed with the nickel catalyst. Thus, a first stage using a nickel catalyst followed by a stage with a getter material for removal of methane and any residual hydrogen, carbon dioxide, carbon monoxide, oxygen, and water leaving the nickel stage (and molecular sieve, if used), effectively remove all contaminants present in an inert gas stream to ppb levels or below. The key to the effectiveness of this method is use of the getter stage after the nickel stage. The nickel stage removes most of the impurities. The getter stage thus has a relatively low challenge and effectively removes remaining impurities to ppb levels or lower.

A variety of getter materials are suitable for the getter stage of this purifier. Zirconium and titanium alloys, such as those listed in Table 1, are preferred.

TABLE 1

| Alloy ID | Weight Percent | | | | | |
| --- | --- | --- | --- | --- | --- | --- |
| | Al | Ti | V | Fe | Zr | Ni |
| 1 | 13.8 | — | — | — | 86.2 | — |
| 2 | 13.7 | — | — | — | 86.3 | — |
| 3 | — | — | — | 26.4 | 73.6 | — |
| 4 | — | — | 1.8 | 29.0 | 69.2 | — |
| 5 | 1.9 | — | 28.1 | 4.4 | 65.6 | — |
| 6 | — | 6.8 | 26.3 | 9.9 | 57.0 | — |
| 7 | 1.7 | 18.1 | 19.5 | 19.0 | 41.7 | — |
| 8 | 1.5 | 13.1 | 21.2 | 15.3 | 48.9 | — |
| 9 | 1.1 | 89.0 | — | 6.0 | — | 3.9 |
| 10 | 1.8 | 64.0 | — | 10.8 | — | 23.4 |

A zirconium/vanadium alloy (such as Alloys 4–8 in Table 1) is preferred for noble gases, but other acceptable getters (such as zirconium-iron alloys) are suitable. When nitrogen is being purified, zirconium-iron, zirconium-nickel, titanium-iron and titanium-nickel alloys are preferred (such as an alloy of [Zr(80%):Fe(18%):Sn(2%)], or Alloys 3, 9, and 10 in Table 1). Zirconium-iron-vanadium alloys, such as alloys 4 to 8 in Table 1, are acceptable, but may react violently with the nitrogen. In addition, when nitrogen is being purified, it is preferable to nitride the alloy prior to use and thereby avoid potentially dangerous exothermic nitriding in the purifier vessel during operation of the purifier.

With reference to FIG. 3(*a*), a preferred embodiment of the present invention is shown. This embodiment utilizes two stainless steel purifier vessels 32 and 34, one for the nickel stage (32) and one for the getter stage (34). The vessels are each 1½ inches out diameter (1.37 inches inner diameter) and 3 inches long. Conventional stainless steel connectors and valves are used to connect vessel 32 to the feed gas source, the vessels to each other, and vessel 34 to the output line for purified gas. This configuration is suitable for a nominal flow rate of 0.9 l/min (i.e. approx. 2 seconds residence time for gas in each vessel at 1 atmosphere pressure). Note that all flow rates described are given in standard l/min.

With reference to FIG. 4, operational results of an ambient temperature nitrogen purifier in accordance with the embodiment of FIG. 3(a) are shown. Tests on this system were conducted at a flow rate of 5 l/min, at room temperature (20–25° C.). The getter alloy was the [Zr(80%):Fe(18%):Sn(2%)] alloy described above. The feed gas is standard grade liquid nitrogen (specified at 99.999% purity). FIG. 4 illustrates impurity levels substantially below 1 ppb. This system has been operated for five weeks without regeneration of the nickel catalyst or getter stages at flows of 5 l/min. At a nominal flow of 0.9 l/min, this is the equivalent of six months of operation without regeneration.

The system shown in FIG. 3(a) is activated by introducing a flow of inert gas (usually argon or nitrogen) in reverse flow (relative to the normal flow for feed gas to be purified) through both the getter and nickel purifier stages. Hydrogen is introduced between the two vessels so that the flow through the nickel stage is about 5% hydrogen and 95% inert gas. (Hydrogen does not enter the getter stage because of the gas flow direction.) In general, 1–10% hydrogen is preferred, but greater percentages of hydrogen may be used. However, care should be taken if nitrogen is the carrier gas to avoid a high enough percentage of hydrogen to create an explosive mixture. These purge gases can be standard grade (specified at 99.999% purity); ultra-high purity is not required. The getter stage is heated with a band heater to a skin temperature of approximately 450–550° C. (preferably 550° C.). This high temperature activation is done so that impurities adsorbed on the surface of the getter are driven into the bulk of the getter and so that stored hydrogen is released from the getter. Thus, the getter has a greater hydrogen sorption capacity when it is subsequently cooled to ambient temperature for operation of the purifier. At the same time, the skin of the nickel vessel is heated to approximately 300° C. The nickel is reduced to elemental nickel by the hydrogen flow as previously described.

The heat and gas flows are applied to both stages for about 4 hours. The heaters and hydrogen flow are then shut off, and the purifier vessels brought back to ambient temperature. Once at room temperature, the purge flow is stopped. The purifier (both the nickel catalyst and the getter stages) has now been activated and is ready for use with the feed gas flowing from the opposite direction.

Referring now to FIG. 3(b), another preferred embodiment of the present invention is shown. This embodiment uses a single stainless steel purifier vessel 36, with three stages: a nickel stage 38, a molecular sieve stage 40, and a getter stage 42. In the embodiment shown, the vessel had a length of 66.5 inches, an outer diameter of 7.5 inches and an inner diameter of 7.25 inches. The length of the stages was 20 inches. This configuration is suitable for a nominal flow rate of 225 l/min. (Those skilled in the art will note that this configuration is also easily used with multiple vessels.) FIG. 5 illustrates nitrogen purification data obtained using the configuration of FIG. 3(b). The purification was conducted at a flow rate of 200 l/min, using [Zr(80%):Fe(18%):Sn(2%)] as the getter alloy.

The systems described may be sized to meet required flow requirements. A 1 m diameter, 5 m long vessel is suited to flows of 60,000 scfh (15 Nm$^3$/hr).

The system shown in FIG. 3(b) is activated in a manner similar to that described with reference to FIG. 3(a). An inert gas such as argon or nitrogen is flowed in the direction opposite to the normal flow direction for feed gas being purified. Hydrogen can be introduced through the molecular sieve stage 40, such that it composes 5% of the total gas flow. Again, the vessel skin of the getter stage is heated to approximately 550° C. and the vessel skin of the nickel stage is heated to approximately 300° C. A third band heater may be employed in which the skin of the molecular sieve stage 40 is heated to 350° C. After four hours of heating, the getter, molecular sieve and nickel are cooled to ambient temperature, the purge flow stopped, and the purifier has been activated for use to purify feed gas flowing in the opposition direction.

FIG. 3(c) shows another preferred embodiment of the present invention, which utilizes a single purification vessel 44. Two stages are used in the purifier: nickel stage 46 and getter stage 48. In the embodiment shown in FIG. 3(c), the getter material is a metal hydride. The hydride is used because hydrogen flowing through the unhydrided getter in relatively large volume may react dangerously with the getter. When a metal hydride is used, the danger of exothermic reaction is avoided. The purifier is activated by initially flowing a 5% hydrogen/95% inert gas (argon or nitrogen) mix in a direction counter flow to the normal purification direction. The unactivated, hydrided getter will allow the hydrogen to pass by without adsorption. The nickel stage is heated to about 300° C. for about four hours. At the end of this heating period, the gas supply is switched to a 100% inert gas source. The getter stage is then heated to about 550° C. while the nickel stage is maintained at approximately 300° C. Heat is applied for another four hours. Hydrogen adsorbed on the hydrided getter is released and any other impurities will be driven into the bulk of the getter. The heaters are then shut off and the activated purifier is cooled to ambient temperature. The feed gas to be purified can then by directed through the purifier in the purification direction.

FIG. 6 illustrates purification results obtained used in the configuration of FIG. 3(c), at a flow rate of 5 l/min. The getter material was [Zr(80%):Fe(18%):Sn(2%)], which is nitrided and hydrided prior to use. Purity data for nitrogen purified using the configuration of FIG. 3(c) is summarized in Table 2 (test duration approximately 24 hours, at 22° C.).

TABLE 2

| Room Temperature Nitrogen Purification (Impurities in PPB) | | | | | | |
| --- | --- | --- | --- | --- | --- | --- |
|  | C | $CH_4$ | $H_2O$ | $O_2$ | $H_2$ | $CO_2$ |
| Average | 0.11 | 0.12 | 0.30 | 0.01 | 0.29 | <0.01 |
| Standard Deviation | 0.02 | <0.01 | 0.04 | <0.01 | 0.01 | <0.01 |
| Minimum | 0.07 | 0.11 | 0.24 | 0.01 | 0.26 | <0.01 |
| Maximum | 0.16 | 0.13 | 0.38 | 0.01 | 0.33 | <0.01 |

The present invention allows easy regeneration of the purifier materials. If the nickel, molecular sieve, or getter stages begin to become saturated with impurities, the purified gas will show an increasing level of impurities. In these instances, the purifier materials can be regenerated in essentially the same manner as the purifier is activated. The feed gas flow is stopped, and flow of inert gas (typically 100% nitrogen or argon) is created in the direction opposite that of the feed gas. With this reverse flow, the getter stage is heated to about 450°–550° C. (preferably 550° C.), while simultaneously heating the nickel stage to about 300° C. Heating the getter causes hydrogen adsorbed on the getter to be released, and any carbon and oxygen to be diffused into the bulk of the alloy (carbon and oxygen are obtained by dissociation of methane, carbon dioxide, carbon monoxide, and water on the getter, as well as any oxygen which passes through the nickel stage and is absorbed on the getter). Molecular sieve, if present, is heated to about 350° C. The quantity of hydrogen released from the getter material (hydrogen which has been absorbed in purification of feed gas) is generally sufficient to regenerate the nickel stage. If it is insufficient, additional hydrogen may be added as described with reference to FIGS. 3(a) to 3(c). It is important that a temperature of approximately 550° C. be used for the getter stage because at lower temperatures (such as 350° C.) less hydrogen is liberated from the getter material. If insufficient hydrogen is generated, the nickel regeneration may not be sufficient to ensure removal of impurities such as CO and hydrogen to sub-ppb levels. FIG. 7 illustrates results for a purifier in the configuration of FIG. 3(a) with regenerated purifier materials. This regeneration process using hydrogen stored on the getter allows in situ regeneration without an external hydrogen source.

Noble gases can also be purified in the same manner as described above with reference to nitrogen. FIG. 8 shows purification data for argon in a purifier of design similar to that shown in FIG. 3(a). The purity data was obtained at a flow rate of 5 l/min from a feed gas of a purity of standard grade (specified at 99.999% purity). In general, argon feed gas contains higher levels of methane than nitrogen feed gas (as do other noble gases, when compared to nitrogen). Therefore, the choice of getter material for the getter stage should be an alloy that has a higher affinity for methane. In particular, we have found that zirconium vanadium alloys are suitable.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A purifier apparatus for low temperature removal of impurities from a noble gas or nitrogen at temperatures between 0° C. and 60° C., the apparatus having a plurality of purification zones consisting of:

(a) a first purification zone containing a particulate material including elemental nickel; and (b) a second purification zone containing a getter material; wherein the gas is first contacted with the nickel containing material and subsequently contacted with the getter material at temperatures, thereby removing impurities from the gas.

2. A method for low temperature removal of impurities from a noble gas or nitrogen at temperatures between 0° C. and 60° C., consisting of:

(a) contacting the gas with a particulate material including elemental nickel at temperatures between 0° C. and 60° C.; and (b) without intermediate heating and cooling, subsequently contacting the gas with a getter material at temperatures between 0° C. and 60° C.; thereby removing impurities from the gas.

3. The apparatus of claim 1, wherein the nickel containing particulate material contains from about 1% to about 5% by weight elemental nickel with an inert material.

4. The apparatus of claim 3, wherein the inert material comprises at least a material selected from the group consisting of alumina and silica.

5. The apparatus of claim 1, wherein the getter material comprises at least a material selected from the group consisting of zirconium, titanium, alloys including zirconium, and alloys including titanium.

6. The apparatus of claim 5, wherein the getter material is nitrided prior to use of the getter material for removal of impurities.

7. The apparatus of claim 5, wherein the getter material prior to its activation is a metal hydride.

8. A purifier apparatus for low temperature removal of impurities from a noble gas or nitrogen at temperatures between 0° C. and 60° C., the apparatus having a plurality of purification zones consisting of:

(a) a first purification zone containing a particulate material including elemental nickel;

(b) a second purification zone containing a molecular sieve material; and (c) a third purification zone containing a getter material; wherein the gas is first contacted with the nickel containing material, then contacted with the molecular sieve material, and subsequently contacted with the getter material at temperatures between 0° C. and 60° C., thereby removing impurities from the gas.

9. The method of claim 2, wherein the nickel containing particulate material contains from about 1% to about 5% by weight elemental nickel with an inert material.

10. The method of claim 9, wherein the inert material comprises at least a material selected from the group consisting of alumina and silica.

11. The method of claim 2, wherein the getter material comprises at least a material selected from the group consisting of zirconium, titanium, alloys including zirconium, and alloys including titanium.

12. The method of claim 11, wherein the getter material is nitrided prior to use of the getter material for removal of impurities.

13. The method of claim 11, wherein the getter material prior to its activation is a metal hydride.

14. A method for low temperature removal of impurities from a noble gas or nitrogen at temperatures between 0° C. and 60° C., consisting of the steps of:

(a) first contacting the gas with a particulate material including elemental nickel at temperatures between 0° C. and 60° C.;

(b) without intermediate heating and cooling, then contacting the gas with a molecular sieve material at temperatures between 0° C. and 60° C.; and (c) without intermediate heating and cooling, then contacting the gas with a getter material at temperatures between 0° C. and 60° C.

15. The apparatus of claim 8, wherein the nickel containing particulate material contains from about 1% to about 5% by weight elemental nickel with an inert material.

16. The apparatus of claim 15, wherein the inert material comprises at least a material selected from the group consisting of alumina and silica.

17. The apparatus of claim 8, wherein the getter material comprises at least a material selected from the group consisting of zirconium, titanium, alloys including zirconium, and alloys including titanium.

18. The apparatus of claim 17, wherein the getter material is nitrided prior to use of the getter material for removal of impurities.

19. The apparatus of claim 17, wherein the getter material prior to its activation is a metal hydride.

20. The method of claim 14, wherein the nickel containing particulate material contains from about 1% to about 5% by weight elemental nickel with an inert material.

21. Material comprises at least a material selected from the group consisting of alumina and silica.

22. The method of claim 14, wherein the getter material comprises at least a material selected from the group consisting of zirconium, titanium, alloys including zirconium, and alloys including titanium.

23. The method of claim 22, wherein the getter material is nitrided prior to use of the getter material for removal of impurities.

24. The method of claim 22, wherein the getter material prior to its activation is a metal hydride.

* * * * *